(12) United States Patent
Ishikawa et al.

(10) Patent No.: US 7,830,559 B2
(45) Date of Patent: Nov. 9, 2010

(54) INFORMATION PROCESSING DEVICE

(75) Inventors: Kazutoshi Ishikawa, Nagano (JP);
Kazunori Takahashi, Nagano (JP)

(73) Assignee: Nidec Sankyo Corporation (JP)

( * ) Notice: Subject to any disclaimer, the term of this patent is extended or adjusted under 35 U.S.C. 154(b) by 893 days.

(21) Appl. No.: 11/731,386

(22) Filed: Mar. 30, 2007

(65) Prior Publication Data
US 2007/0286043 A1    Dec. 13, 2007

(30) Foreign Application Priority Data

Mar. 31, 2006 (JP) .............................. 2006-099906
Jul. 25, 2006 (JP) .............................. 2006-201773

(51) Int. Cl.
*H04N 1/04* (2006.01)

(52) U.S. Cl. .................. 358/474; 358/496; 358/498; 358/486; 358/505; 399/116; 396/316; 369/53.11; 235/470

(58) Field of Classification Search .................. 358/474, 358/505, 496, 498, 488, 486, 408, 506; 399/116, 399/367; 396/316, 315, 317; 271/9.01, 10.09, 271/127; 369/53.11; 235/470, 454
See application file for complete search history.

(56) References Cited

U.S. PATENT DOCUMENTS 4,202,614 A * 5/1980 Harvey ....................... 396/336
5,232,407 A * 8/1993 Wolf et al. ................... 474/101
6,157,785 A * 12/2000 Kawano et al. .............. 396/315
6,711,355 B1 * 3/2004 Smart et al. ................. 396/316
7,379,217 B2 * 5/2008 Amimoto et al. ............ 358/487
7,450,883 B2 * 11/2008 Asaoka et al. ............... 399/116
2006/0283229 A1 * 12/2006 Futamura et al. .............. 72/443

FOREIGN PATENT DOCUMENTS

JP        2002-259902         9/2002

* cited by examiner

*Primary Examiner*—Negussie Worku
(74) *Attorney, Agent, or Firm*—Cantor Colburn LLP

(57) ABSTRACT

An information processing device may include a first frame provided with a scanner for reading information recorded on a medium, a second frame which faces the first frame across a traveling path and is provided with a pressing member for pressing the medium toward a reading face of the scanner, a support plate which supports the pressing member and whose one end is axially supported with the second frame to be movable between a locked position where the pressing member is protruded in the traveling path and an open position where a reading face of the scanner is exposed, a locking part for locking the support plate to the second frame at the locked position, and a half lock preventing mechanism for preventing a half-lock state when the support plate is locked to the second frame.

11 Claims, 6 Drawing Sheets

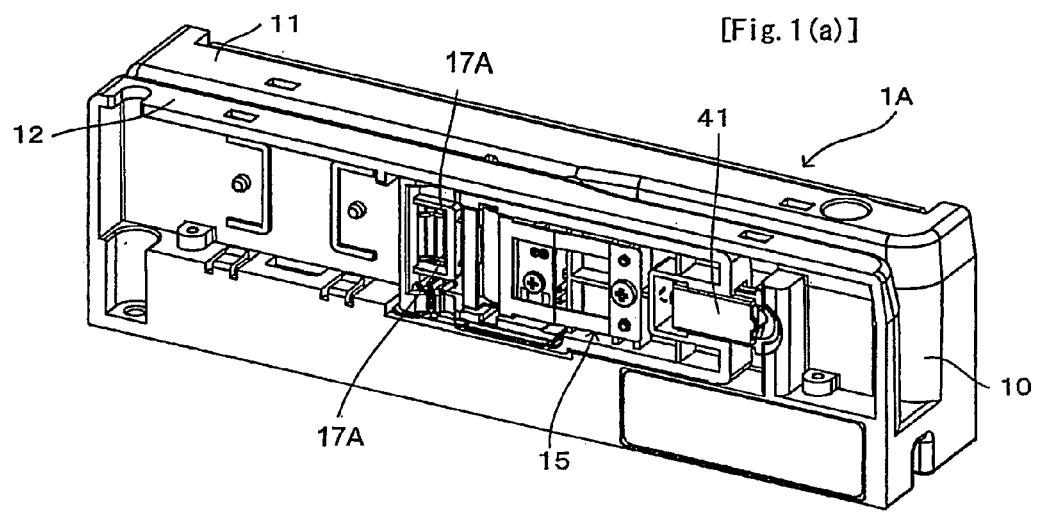
[Fig. 1(a)]
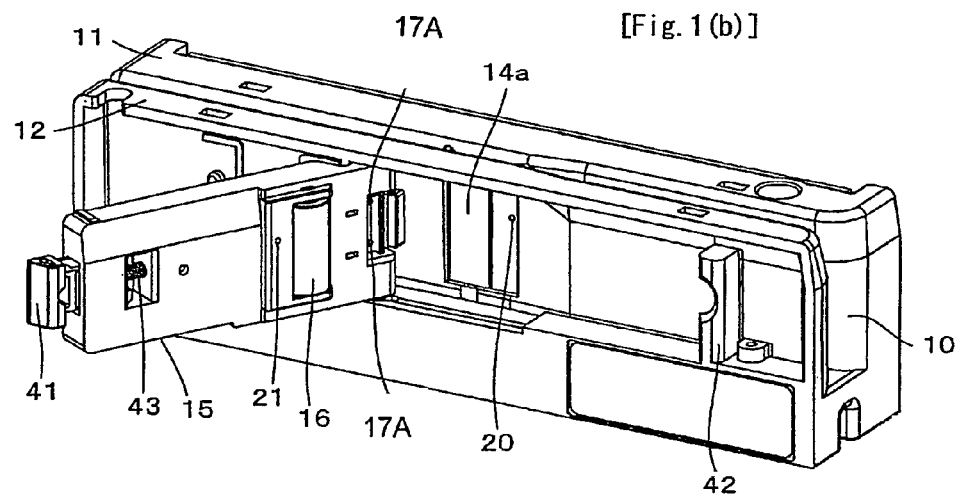
[Fig. 1(b)]

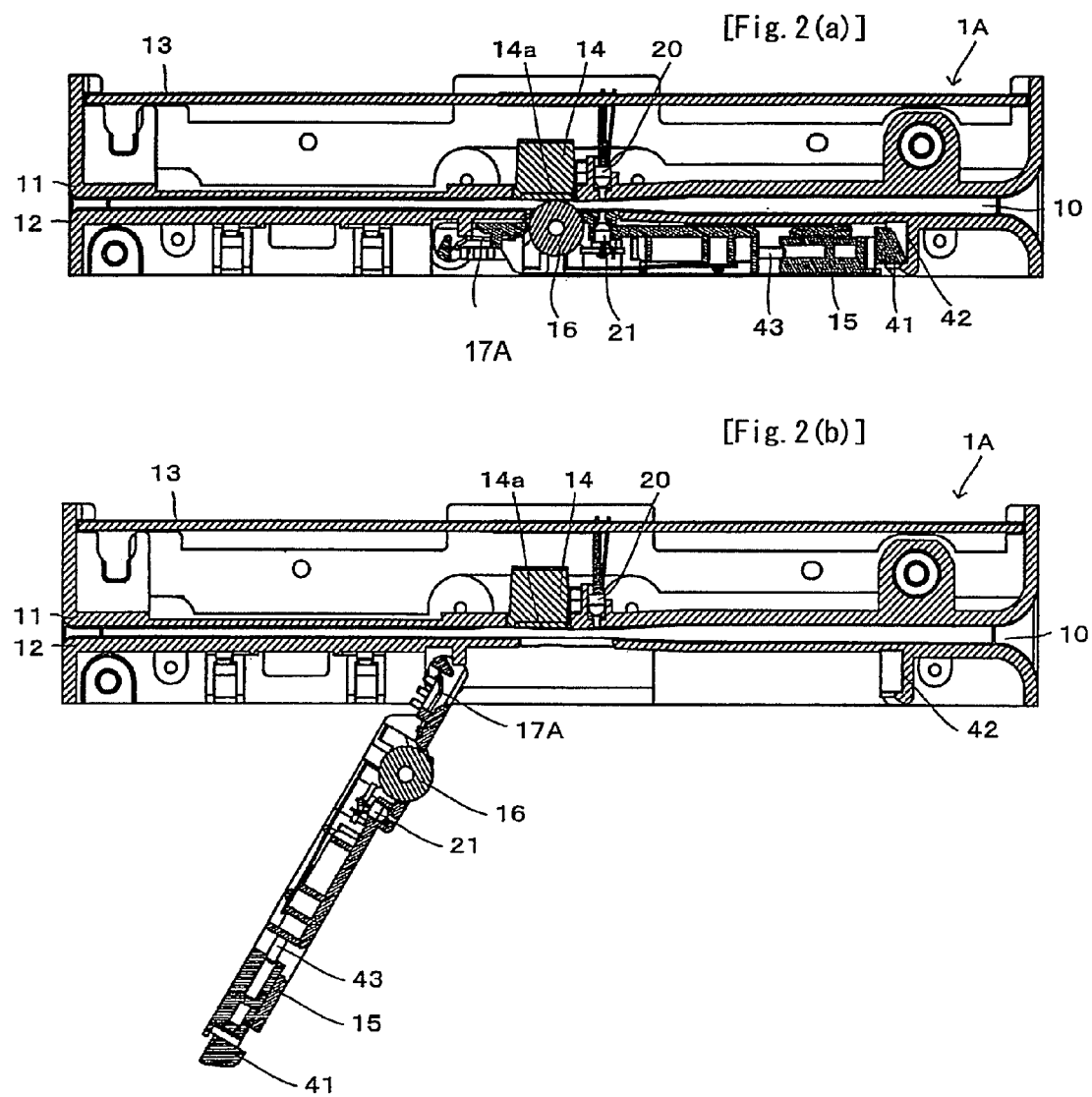

[Fig. 3]
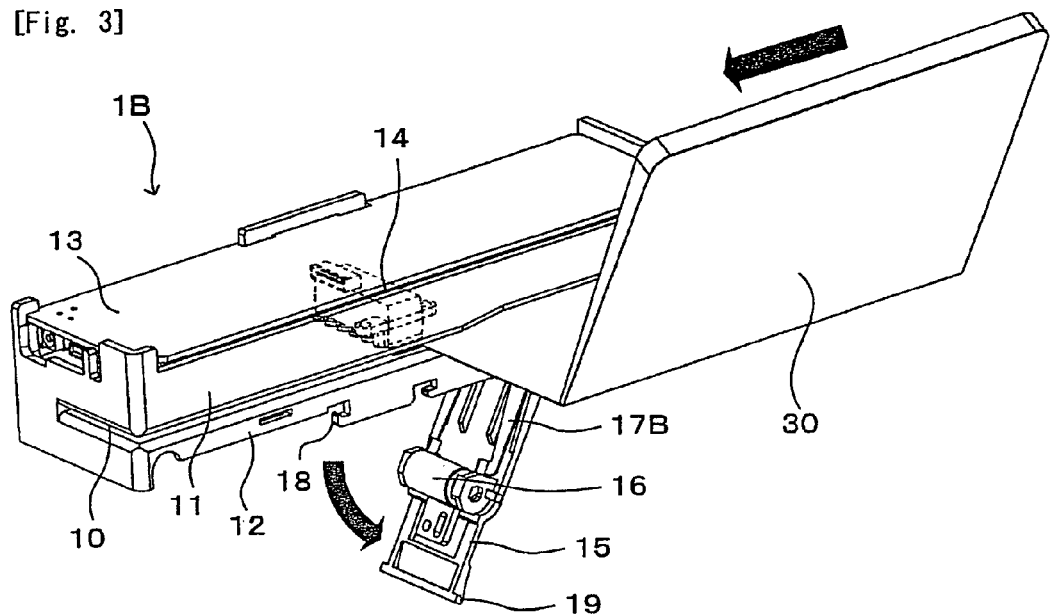
[Fig. 4]
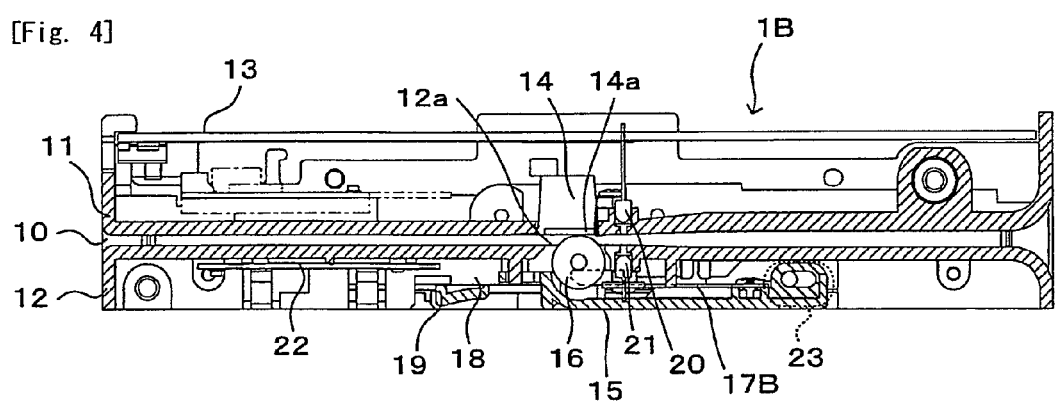

[Fig. 5(a)]
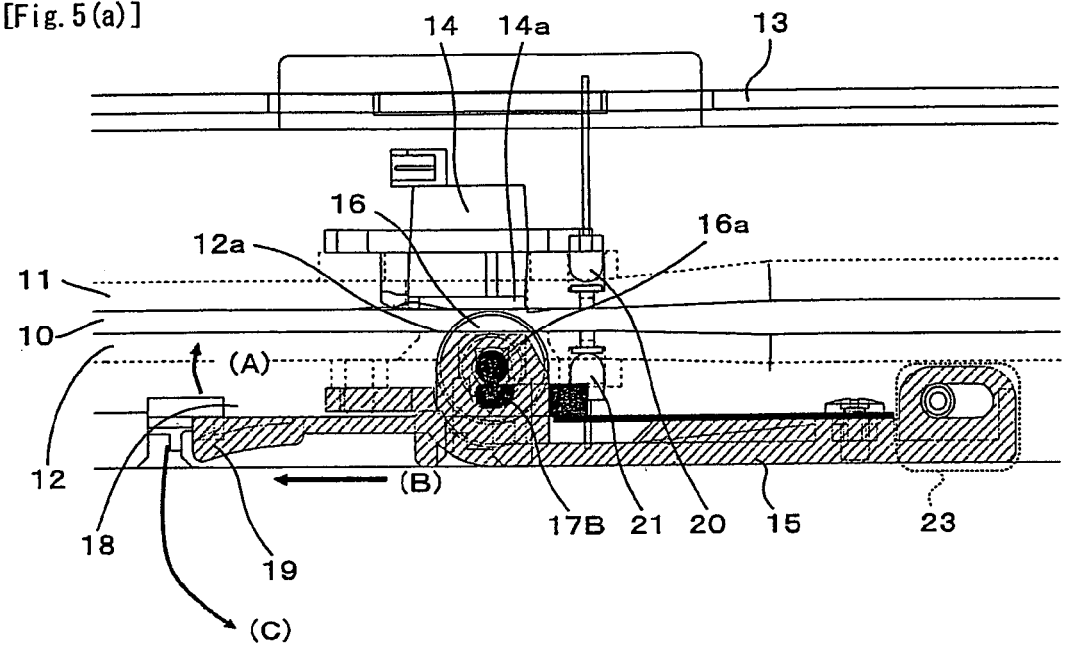
[Fig. 5(b)]
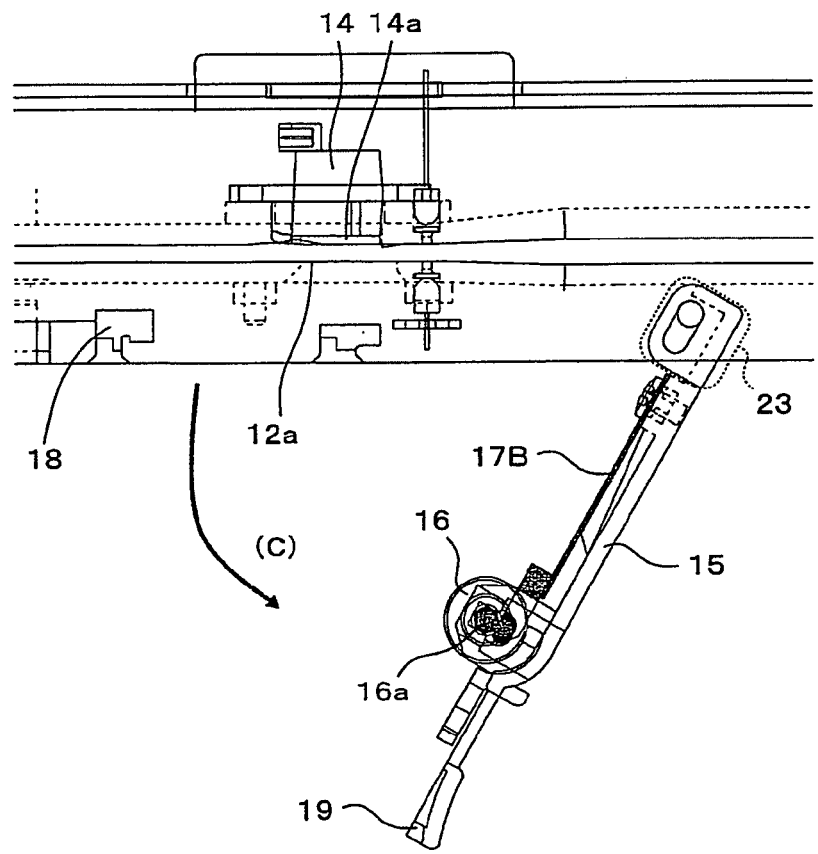

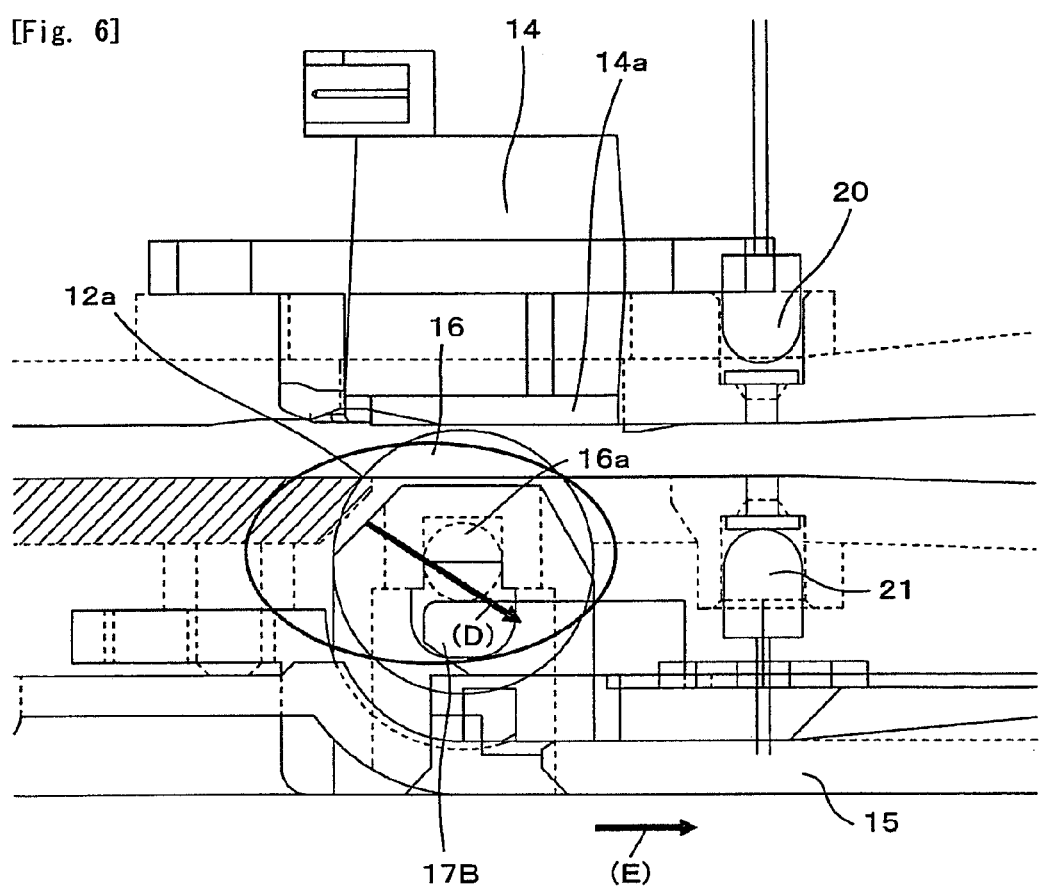

[Fig. 7(a)]
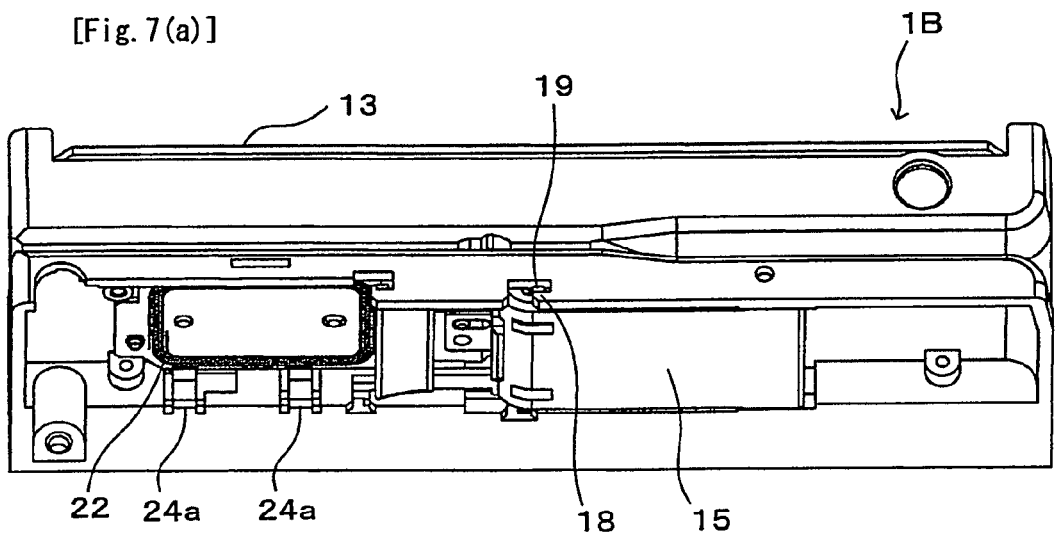
[Fig. 7(b)]
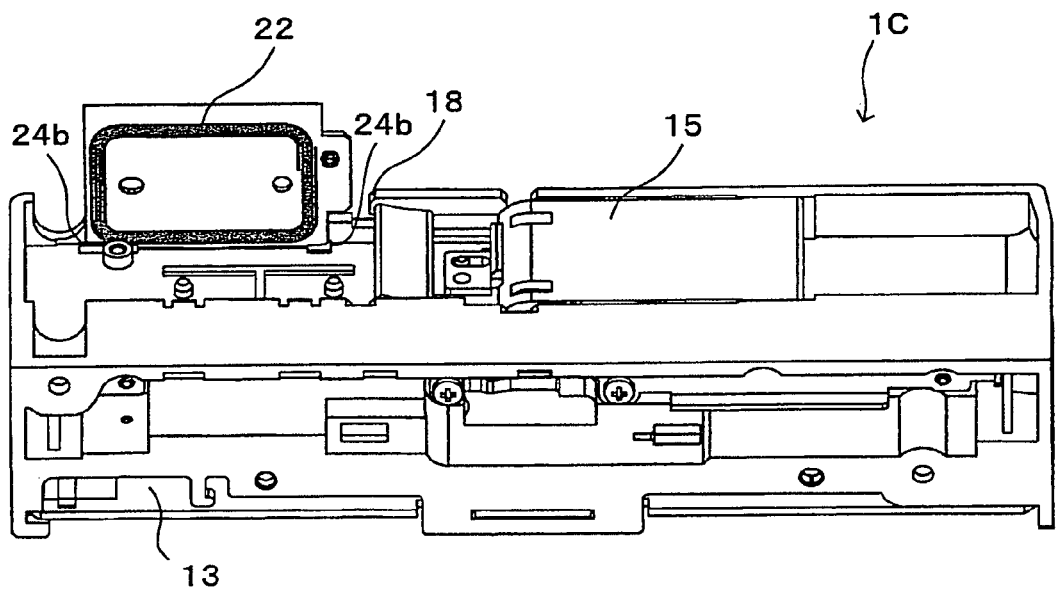

INFORMATION PROCESSING DEVICE

CROSS REFERENCE TO RELATED APPLICATION

The present invention claims priority under 35 U.S.C. §119 to Japanese Application No. 2006-99906 filed Mar. 31, 2006, and Japanese Application No. 2006-201773 filed Jul. 25, 2006, both of which are incorporated herein by reference.

FIELD OF THE INVENTION

An embodiment of the present invention may relate to an information processing device for reading and processing information recorded on an information recording medium which is made of paper, plastic or the like.

BACKGROUND OF THE INVENTION

A manually operated swipe type information processing device has been conventionally known in which a card is manually swiped in a guide portion (card traveling path) for reading information recorded on the card. In this specification, the word "swipe" means an operation of a card-shaped information recording medium which is manually moving along a guide portion (card traveling path) of an information processing device.

The manually operated swipe type information processing device is provided with an image scanner for taking an image of a pattern such as a two-dimensional bar-code on a card face to obtain its image data. For example, a reduced optical type image scanner is used as the image scanner (see, for example, Japanese Patent Laid-Open No. 2002-259902). The reason of utilizing the reduced optical type image scanner is that, since its depth of field is deep, it is easy to focus even when a relative distance of a card to a reading face is varied due to movement (swiping) of the card.

However, when the reduced optical type image scanner is utilized, an optical path length is required to be longer to some extent and thus the entire device is liable to enlarge. Especially, it is not suitable for the image scanner to be mounted on a portable information processing device which is capable of being carried around. Further, a reduced optical type image scanner is expensive in comparison with other scanners such as a contact type image scanner and thus it is not preferable as an image scanner which is mounted on a portable information processing device whose unit price is inexpensive.

From such a point of view, a portable information processing device has been reconsidered on which a contact type image scanner is mounted instead of a reduced optical type image scanner. A length of the contact type image scanner is shorter and thus its size is smaller than the reduced optical type image scanner. Therefore, the contact type image scanner is suitable for a portable information processing device.

A portable information processing device is provided with convenience of portability and thus its using place can be changed or it can be taken out to a visiting place. Therefore, a reading face (glass face) of a contact type image scanner which is mounted on the portable information processing device is often used in an environment that is easy to be dirty in comparison with an indoor installation type information processing device. Accordingly, cleaning of the glass face of the contact type image scanner is an extremely important work.

As a first technique for cleaning the glass face of the contact type image scanner, for example, it is conceivable that a cleaning card is swiped in the portable information processing device. A cleaning card is formed of, for example, a substrate made of PETP (poly ethylene terephthalate) on which acrylic resin or glass fibers are adhered. According to the above-mentioned cleaning method, fragments and dust which are stuck to the glass face of the contact type image scanner can be removed by tangling them with acrylic resin or glass fibers.

However, in this first technique, cleaning of the glass face of the contact type image scanner is not performed directly while the glass face is visually observed Therefore, an operator cannot visually observe and confirm whether fragments and dust which are stuck to the glass face have been removed or not. On the contrary, even in the case that the operator has visually confirmed that the fragments and dust were not removed, when their adhesive force is large, it is difficult that they are effectively removed only by using a cleaning card.

In order to solve the problem as described above, as a second technique to clean the glass face of the contact type image scanner while the glass face is directly and visually observed, it may be conceivable that a part of a frame on an opposite side to a frame on which the contact type image scanner is provided is structured slidably in a carrying direction of an information recording medium. According to the structure described above, the glass face of the contact type image scanner can be visually observed by sliding the frame and thus the fragments and dust stuck to the glass face can be removed surely.

However, the second cleaning technique described above has the following problems.

First, when a part of the frame of the contact type image scanner is to be slid in the carrying direction of an information recording medium, a large space is required by the sliding amount of the frame. Therefore, the size of the information processing device cannot be reduced.

Further, even when the glass face of the contact type image scanner has been cleaned, cleaning of a roller which is commonly arranged at a position facing the glass face is difficult. In other words, when a part of the frame is simply slid, although the glass face can be observed visually, the roller facing the glass face is difficult to be observed visually. Accordingly, the roller is difficult to be cleaned sufficiently.

In addition, when the frame is opened and closed by a slide operation, there is a possibility that a user does not notice that the frame has been in a half-lock state (not completely closed state). Further, even in a state that the frame is completely closed after cleaning has been finished, for example, when vibration is applied to the information processing device for a long time, the frame may be moved from the completely closed state to the half-lock state.

SUMMARY OF THE INVENTION

In view of the problems described above, an embodiment of the present invention may advantageously provide an information processing device which is capable of sufficiently cleaning at least a scanner and a pressing member (for example, a roller) which faces the scanner in the information processing device, which is capable of preventing a half-lock state, and whose size of the entire device can be compact Thus, according to an embodiment of the present invention, there may be provided an information processing device as described in the following examples.

First Example

An information processing device comprising:
a traveling path on which an information recording medium is carried; a first frame which is provided with a scanner for reading information recorded on the information recording medium;

a second frame which faces the first frame across the traveling path and is provided with a pressing member for pressing the information recording medium toward a reading face of the scanner;

a support plate which supports the pressing member and whose one end is axially supported by the second frame so as to be movable between a locked position where the pressing member is protruded in the traveling path and an open position where the reading face of the scanner is exposed;

a locking part for locking the support plate to the second frame at the locked position; and a half lock preventing mechanism for preventing a half-lock state of the support plate when the support plate is locked to the second frame.

According to the first embodiment, the information processing device includes a first frame which is provided with a scanner, a second frame which faces the first frame across a traveling path and is provided with a pressing member for pressing an information recording medium toward a reading face of the scanner, a support plate which supports the pressing member and whose one end is axially supported by the second frame so as to be movable between the locked position where the pressing member is protruded in the traveling path and the open position where the reading face of the scanner is exposed, and a locking part for locking the support plate to the second frame at the locked position. In addition, this information processing device further includes a half lock preventing mechanism for preventing the half-lock state of the support plate when the support plate is locked to the second frame. Therefore, the above-mentioned problems can be prevented.

In other words, when the reading face of the scanner is to be cleaned, the support plate is turned to expose the reading face of the scanner and thus the reading face of the scanner can be observed. As a result, fragments and dust which are stuck to the reading face can be removed surely. In addition, when the support plate is turned, the pressing member is moved from the locked position to the open position and thus the pressing member can be also observed. Therefore, as well as the reading face of the scanner, fragments and dust which are stuck to the pressing member such as a roller can be removed surely.

When fragments and dust stuck to the pressing member are removed, the fragments and dust are not transferred to the reading face of the scanner and thus the reading face of the scanner can be prevented from being dirty due to the pressing member. Further, for example, in a case that an information processing device is structured in which a space with a constant value between an information recording medium and a glass face of the scanner is provided in order not to damage the glass face of the scanner or to maintain a constant focal length, the glass face can not be cleaned by a cleaning card originally. However, in the information processing device according to the first example, the glass face can be easily cleaned by turning of the support plate to expose the reading face (glass face) of the scanner.

Further, according to the first example, the frame does not slide largely along the carrying direction of the information recording medium and thus a large space is not required in the carrying direction of the information recording medium. Therefore, the size of the entire device can be compact.

In addition, the information processing device according to the first example comprises a locking part for locking the support plate to the second frame at the locked position where the pressing member is protruded to the traveling path and a half lock preventing mechanism for preventing a half-lock state of the support plate when the support plate is locked to the second frame. Therefore, since the information processing device is provided with the half-lock function, its usefulness can be enhanced (reliability of maintenance work can be enhanced).

In the conventional information processing device, when a slide operation of the frame has been repeated many times, a gap space between the reading face (glass face) of the contact type image scanner and the roller may be larger. Further, the reading face may be damaged by the roller which contacts with the reading face at the time of the slide operation. Larger gap space or damaged reading face may cause reduction of recognition accuracy of the information processing device. However, in the information processing device according to the above-mentioned first example, the reading face of the scanner is cleaned without performing the slide operation of the frame and thus the reading face is not damaged by the roller and reduction of recognition accuracy of the information processing device can be prevented.

In this specification of the present invention, the "open position" means a position where the support plate has been moved to an extent that the reading face of the scanner is exposed to be cleaned while visually observing dirt on the reading face. In other words, the "open position" requires that cleaning is possible and thus the "open position" may include a position where the support plate has moved halfway in its movable range as well as the position where the support plate has moved to the maximum open position.

In this specification, the "locking part" may utilize any portion with which the support plate can be locked to the second frame. For example, as described below, the "locking part" may comprise a pawl member and a pawl engaging member, or comprise a hook part and a hook engaging part. Alternatively, the "locking part" may comprise a protruded part and a recessed part which are formed in a predetermined shape or, for example, a locking opening and a stopper capable of being inserted into the locking opening, or any combination may be utilized.

Further, the "half lock preventing mechanism" may utilize any mechanism which is capable of preventing a half lock state when the support plate is locked to the second frame. In other words, the half lock preventing mechanism functions to locate either of the "locked position" where the support plate is surely locked to the second frame or the "open position" where the support plate is surely separated from the second flame and, therefore, the half lock state of the support plate which is incompletely locked to the second frame is prevented. For example, as described below, a pawl member and a pawl engaging member are engaged with each other to prevent the support plate from moving to a direction of the open position and, as a result, the support plate is surely located at the locked position to prevent from moving to the half lock state. Alternatively, the support plate is forced to be located at the open position surely separated from the second frame by utilizing an urging force of an urging member to prevent the half lock state. Further, the half lock state may be prevented by using a protruded part and a recessed part which are formed in a predetermined shape or, for example, may be prevented by using an engaging opening and a stopper capable of being inserted into the engaging opening, and any combination may be utilized.

Second Example

The information processing device according to the above-mentioned first example, wherein the locking part comprises a pawl member which is urged in a direction roughly parallel to the traveling path and a pawl engaging member having a recessed part with which the pawl member engages, the pawl member is provided in one of an other end on an opposite side to the one end of the support plate and the second frame, the pawl engaging member is provided in the other of the other end on an opposite side to the one end of the support plate and the second frame and, when the support plate is located at the locked position, the half lock preventing mechanism restrains movement of the support plate toward the open position due to engagement of the pawl member with the pawl engaging member.

According to the second example, the locking part comprises a pawl member which is urged in a direction roughly parallel to the traveling path and a pawl engaging member having a recessed part with which the pawl member engages and, when the support plate is located at the locked position, the half lock preventing mechanism restrains movement of the support plate toward the open position due to engagement of the pawl member with the pawl engaging member. Therefore, while a half lock state is prevented through a simple one-touch operation, the reading face of the scanner and the pressing member can be surely cleaned.

Third Example

The information processing device according to the above-mentioned second example, wherein the half lock preventing mechanism further comprises a first urging member which is disposed near the one end of the support plate for urging the support plate toward the open position, and the first urging member causes the support plate to move toward the open position when engagement of the pawl member with a recessed part of the pawl engaging member is released, and the first urging member urges the support plate so as to maintain a distance between the pressing member disposed on the support plate and the traveling path when the support plate is located at the locked position.

According to the third example, the half lock preventing mechanism further comprises a first urging member which is disposed near the one end of the support plate for urging the support plate toward the open position, and the first urging member causes the support plate to move toward the open position when engagement of the pawl member with a recessed part of the pawl engaging member is released. Therefore, a half lock state is surely prevented. Further, when the support plate is going to be locked to the locked position, the pressing member can be prevented from colliding with the reading face (glass face, for example) of the scanner to protect the reading face. Further, the first urging member urges the support plate so as to maintain a distance between the pressing member disposed on the support plate and the traveling path when the support plate is located at the locked position. Therefore, read accuracy of the scanner can be maintained satisfactorily. In addition, when the support plate is going to be moved toward the open position, since the support plate is separated from the second frame a little by the urging force of the first urging member, an operator can easily hold a part of the support plate such as the pawl member and thus the support plate can be moved simply. In addition, when the support plate is going to be locked to the second frame, the support plate can be surely locked by the urging force of the first urging member.

Fourth Example

The information processing device according to the above-mentioned first example, further comprising a sensor for detecting passing of the information recording medium which comprises a light emitting element for emitting light to the information recording medium and a light receiving element for receiving the light from the light emitting element, and wherein one of the light emitting element and the light receiving element is mounted on the support plate and the other of the light emitting element and the light receiving element is mounted on the first frame.

According to the fourth example, the information processing device further comprises a sensor for detecting passing of the information recording medium, and one of a light emitting element and a light receiving element which structure the sensor, is mounted on the support plate and the other is mounted on the first frame. Therefore, the light emitting element or the light receiving element as well as the reading face of the scanner and the pressing member such as the roller can be cleaned while observing cleaning state with respect to dirt More specifically, for example, in a case of an information processing device in which a medium detecting sensor (a light emitting element such as an LED and a light receiving element such as a phototransistor) disposed adjacent to the scanner is integrated into the first frame or the second frame, it is difficult to clean the light emitting element and the light receiving element by a hand directly. In addition, different from the scanner, no pressing member for pressing an information recording medium to the light emitting element or the light receiving element is provided and thus it is difficult to wipe dirt off with a cleaning card. However, in the information processing device according to this example, either of the light emitting element or the light receiving element is provided in the support plate as well as the pressing member and thus the light emitting element or the light receiving element is moved to the open position along with the support plate. Accordingly, the light emitting element or the light receiving element can be also cleaned while observing cleaning state with respect to dirt.

Fifth Example

The information processing device according to the above-mentioned first example, further comprising a second urging member for urging the pressing member in a direction for pressing the information recording medium, and an opening which is formed in the second frame for permitting the pressing member to protrude in the traveling path, wherein the support plate is supported so that the pressing member and the second urging member are capable of being close to or separated from the opening, and the half lock preventing mechanism is structured in which, when the support plate is to be locked to the locked position, the pressing member abuts with a part of the opening to urge the support plate to the locked position by an urging force of the second urging member.

According to the fifth example, the information processing device comprises a second urging member for urging the pressing member in a direction for pressing the information recording medium and an opening which is formed in the second frame for permitting the pressing member to protrude in the traveling path, and the half lock preventing mechanism is structured in which, when the support plate is going to be locked to the locked position, the pressing member abuts with a part of the opening to urge the support plate to the locked position by an urging force of the second urging member. Therefore, the reading face of the scanner and the pressing member can be surely cleaned, the size of the entire device can be reduced, and half-lock preventing function is obtained and thus usefulness of the information processing device can be enhanced.

More specifically, according to the fifth example, the pressing member abuts with a part of the opening and the support plate is urged to the locked position by an urging force of the second urging member. Therefore, when the support plate for closing the reading face of the scanner is going to be closed, a half-lock state is prevented by the locking part and the urging force of the urging member. Further, when the support plate for closing the reading face of the scanner is closed, shifting to a half-lock state is prevented and thus its usefulness can be enhanced (as a result, reliability of maintenance work can be enhanced).

Sixth Embodiment

The information processing device according to the above-mentioned fifth example, wherein
 a support portion of the support plate which axially supports the support plate is movable in a direction that is roughly parallel to the traveling path, and
 the locking part comprises a hook part, which is provided in one of the second frame and the support plate for permitting movement of the support plate in the direction roughly parallel to the traveling path, and a hook engaging part which is provided in the other of the second frame and the support plate for engaging with the hook part.

According to the sixth example, a support portion of the support plate which axially supports the support plate is movable in a direction that is roughly parallel to the traveling path, and the locking part comprises a hook part for permitting movement of the support plate in the direction roughly parallel to the traveling path and a hook engaging part for engaging with the hook part. Therefore, a half-lock state can be surely prevented with one touch operation through a simple operation of the hook engaging part engaging with the hook part.

Specifically, the hook part in this example permits movement of the support plate in the direction roughly parallel to the traveling path. In other words, since displacement of the pressing member in a direction perpendicular to the traveling path is restrained by the hook part, a distance between an information recording medium and the reading face of the scanner is maintained and thus reading accuracy of the scanner can be improved.

Seventh Example

The information processing device according to the above-mentioned sixth example, wherein the support portion is provided on a leading side to the scanner of the traveling path where carrying of the medium is started.

According to the seventh example, the support portion is provided on a leading side to the scanner of the traveling path where carrying of the medium is started. Therefore, on another side, i.e., on the opposite side to the support portion in the traveling path, another information processing component (electrical element) such as a non-contact communication antenna can be provided and thus an idle space in the information processing device can be utilized effectively.

Eighth Example

The information processing device according to the above-mentioned first example, further comprising a sensor for detecting passing of the information recording medium,
 wherein the sensor and the scanner are closely disposed along a carrying direction of the information recording medium in this order.

According to the eighth example, the sensor for detecting passing of the information recording medium and the scanner are closely disposed in the first frame along a carrying direction of the information recording medium in this order. Therefore, an interval after a sensor signal has been outputted till communication with an information recording medium is started is shortened and, as a result, information reading accuracy of the scanner can be improved. Further, the sensor is provided on a leading side to the scanner of the traveling path where carrying of the medium is started. Therefore, when the support plate is slid in a permitting range of the locking part, an interference of the pressing member with a sensor supported by the support plate can be prevented.

Ninth Example

The information processing device according to the above-mentioned first example, wherein the pressing member is one of a roller and a magnetic head.

According to the ninth example, the pressing member is one of a roller and a magnetic head. Therefore, in a case that an inexpensive roller is used, manufacturing cost can be reduced and, alternatively, for example, in a case that a magnetic head for reading magnetic information recorded on a magnetic stripe is used, obtaining of optical image information and reading of magnetic information (and writing) can be performed simultaneously and thus efficiency of obtaining the information can be improved. Further, when the roller or the magnetic head is selectively used depending on an application or a situation, convenience of the information processing device can be secured.

Tenth Example

The information processing device according to the above-mentioned first example, further comprising a non-contact communication antenna which is provided on the second frame and disposed near another end of the traveling path for non-contact communicating with the information recording medium.

According to the tenth example, a non-contact communication antenna is provided on the second frame and disposed near another end of the traveling path for non-contact communicating with the information recording medium. Therefore, a hybrid type information processing device can be obtained. Further, since the non-contact communication antenna is disposed near another end (terminating end) of the traveling path to the scanner, an information recording medium is easily stopped after an image has been taken and thus stability of IC communication can be secured.

Eleventh Example

The information processing device according to the above-mentioned first example, further comprising a plurality of non-contact communication antenna attaching parts which is provided on the second frame and disposed near another end of the traveling path for attaching and detaching a non-contact communication antenna for non-contact communicating with the information recording medium.

According to the eleventh example, non-contact communication antenna attaching parts are provided on the second frame and disposed near another end of the traveling path for attaching and detaching a non-contact communication antenna. In this example, the non-contact communication antenna is capable of attaching and detaching to the second frame, and a plurality of the non-contact communication antenna attaching parts are provided Therefore, a plurality of mounting positions for the non-contact communication antennas is provided in the information processing device and thus convenience of the information processing device for a customer can be expanded.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 1(a) and 1(b) are perspective views showing appearance of an information processing device in accordance with a first embodiment of the present invention.

FIGS. 2(a) and 2(b) are sectional views showing a mechanical structure of an information processing device in accordance with the first embodiment.

FIG. 3 is a perspective view showing appearance of an information processing device in accordance with a second embodiment of the present invention.

FIG. 4 is a sectional view showing a mechanical structure of an information processing device in accordance with the second embodiment.

FIGS. 5(a) and 5(b) are explanatory views for explaining a function of a hook part and a hook engaging part in an information processing device in accordance with the second embodiment.

FIG. 6 is an explanatory view for explaining a force which acts when a support plate is in a locking state in accordance with the second embodiment.

FIGS. 7(a) and 7(b) are explanatory views for explaining another mounting position of a non-contact communication antenna.

DETAILED DESCRIPTION OF THE PREFERRED EMBODIMENTS

Embodiments of the present invention will be described below with reference to the accompanying drawings.

First Embodiment

FIGS. 1(a) and 1(b) are perspective views showing appearance of an information processing device 1A in accordance with a first embodiment of the present invention. FIGS. 2(a) and 2(b) are sectional views showing a mechanical structure of the information processing device 1A in accordance with the first embodiment. FIG. 1(a) and FIG. 2(a) show states where a support plate 15 is locked to a second fame 12, and FIG. 1(b) and FIG. 2(b) show states where a reading face 14a of a scanner 14 is exposed.

In FIGS. 1(a), 1(b) and FIGS. 2(a), 2(b), a (swipe type) information processing device 1A includes a first frame 11 having a contact type image scanner 14 for taking an image on an information recording medium (for example, bar-code or OCR character) and a second frame 12 which faces the first frame 11 across a medium traveling path 10 and which is provided with a roller 16 for pressing an information recording medium toward the reading face 14a of the contact type image scanner 14. The first frame 11 and the second frame 12 form a frame whose cross-sectional shape is in a roughly "U"-shape. The contact type image scanner 14 emits light from a light source on an information recording medium through the reading face 14a and reflected light from the information recording medium 30 is received by a light receiving element such as a photodiode or a CCD to take an image on the information recording medium.

The second frame 12 is provided with a support plate 15 whose one end is axially supported by the second frame 12 and which supports the roller 16 (see FIG. 1(b) and FIGS. 2(a) and 2(b)). The support plate 15 movably supports the roller 16 between a locked position where the roller 16 faces the medium traveling path (see FIG. 2(a)) and an open position where the reading face 14a of the contact type image scanner 14 is exposed (see FIG. 2(b)).

Further, the support plate 15 is provided with a pawl member 41 which is urged by a pawl urging member 43 in a roughly parallel direction to the traveling path 10. The second frame 12 is provided with a pawl engaging member 42 having a recessed part with which the pawl member 41 engages. In this embodiment, the pawl member 41 is provided in the support plate 15 and the pawl engaging member 42 is provided in the second frame 12 but they may be provided in a reversed manner. Further, in this embodiment, the pawl engaging member 42 is integrally formed with the second frame 12 but may be formed in a separated manner from the second frame 12.

The pawl member 41 and the pawl engaging member 42 function as an example of a fixing part for locking the support plate 15 with the second frame 12. In addition, they also functions as an example of a half lock preventing mechanism when the support plate 15 is going to be locked with the second frame 12. Specifically, when the support plate 15 is located at the locked position, movement in a direction toward the open position of the support plate 15 is prevented by the pawl engaging member 42 which is engaged with the pawl member 41.

Further, the information processing device 1A is provided with a wire spring (an example of a first urging member) 17A as a part of the half lock preventing mechanism which is disposed in the vicinity of one end of the support plate 15 to urge the support plate 15 toward the direction of the open position. The support plate 15 is moved toward the open position (see FIG. 2(b)) by the wire spring 17A when the pawl member 41 is disengaged from the recessed part of the pawl engaging member 42. On the contrary, when the support plate 15 is located at the locked position (see FIG. 2(a)), the wire spring 17A urges the support plate 15 to maintain the locked position. In other words, when the pawl member 41 is disengaged from the recessed part of the pawl engaging member 42, the support plate 15 is moved (turned) in a direction apart from the second frame 12 by an urging force of the wire spring 17A. As a result, the support plate 15 surely reaches to the "open position" apart from the second frame 12 and thus a half rock state can be prevented. Further, when the support plate 15 is going to be closed to the locked position, the roller 16 is prevented from colliding with the reading face (glass face) 14a of the contact type image scanner 14 to protect the reading face 14a. Further, when the support plate 15 is located at the "locked position" where the support plate 15 is closed, a space between the roller 16 and the reading face 14a of the contact type image scanner 14 is maintained at a constant value and thus reading accuracy can be improved. In addition, the support plate 15 can be easily moved to the open position.

In the information processing device 1A, the support plate 15 is provided with an LED 21 (light emitting element) for emitting light to an information recording medium and the first frame 11 is provided with a reading start sensor 20 (light receiving element) for receiving light from the LED 21. The reading start sensor 20 is mounted on a control board 13 and provides a reading start trigger for the contact type image scanner 14.

Contrary to this embodiment, it may be structured that the LED 21 is mounted on the second frame 12 and the reading start sensor 20 is mounted on the support plate 15. However, like this embodiment of the present invention, when the LED 21 is mounted on the support plate 15 and the reading start sensor 20 is mounted on the first frame 11, reading accuracy of the information processing device 1A can be improved. More specifically, when the reading start sensor 20 is mounted on the support plate 15, an electric wiring for transmitting a (faint) read signal becomes longer and thus noise is easy to be generated on a read signal and reading accuracy may be reduced. However, when the LED 21 is mounted on the support plate 15, such a problem does not occur because only power is supplied to the LED 21. Therefore, reading accuracy of the information processing device 1A can be improved. Further, a lead wire for supplying power to the LED 21 is wired at an axial portion where the second support plate 15 is turnably supported by the frame 12, in other words, the lead wire is passed through the inside or vicinity of the shaft Therefore, the lead wire is prevented from tangling.

Second Embodiment

FIG. 3 is a perspective view showing appearance of an information processing device 1B in accordance with a second embodiment of the present invention. FIG. 4 is a sectional view showing a mechanical structure of the information processing device 1B in accordance with the second embodiment. FIG. 3 shows a state where an information recording medium 30 is swiped in the swipe type information processing device 1B. In FIG. 4, the information recording medium 30 which is shown in FIG. 3 is not shown. In addition, FIG. 3 shows an open state of the support plate 15 and FIG. 4 shows a closed state of the support plate 15.

In FIG. 3 and FIG. 4, an information processing device 1B includes a first frame 11 having a contact type image scanner 14 for taking an image on an information recording medium 30 and a second frame 12 which faces the first frame 11 across a medium traveling path 10 and which is provided with a roller 16 for pressing the information recording medium 30 to the reading face 14a (see FIG. 4) of the contact type image scanner 14. Similarly to the information processing device 1A, the first frame 11 and the second frame 12 form a frame whose cross-sectional shape is in a roughly "U"-shape.

The second frame 12 is formed with an opening 12a (see FIG. 4) for protruding the roller 16 to the traveling path 10 and is provided with a support plate 15 whose one end (support portion 23) is axially supported by the second frame 12 so as to be turnable. The support plate 15 is provided with the roller 16 and a flat spring 17B (an example of a second urging member) for urging the roller 16 in a direction where the roller 16 is pressed to the information recording medium 30. The support plate 15 supports the roller 16 and the flat spring 17B so that they can approach to or separate from the opening 12a. The support portion 23 is, as shown in FIG. 4, arranged on a leading end side from which a medium is started moving (right side in FIG. 4) of the running path 10 with respect to the contact type image scanner 14.

In FIG. 4, the first frame 11 and the second frame 12 are respectively provided with a reading start sensor 20 and an LED 21 for detecting movement of an information recording medium 30. The reading start sensor 20 and the contact type image scanner 14 are disposed in the first frame 11 along a carrying direction of the information recording medium 30 in this order and they are arranged in a close relation.

Similarly to the information processing device 1A, the reading start sensor 20 is mounted on a control board 13 and provides a trigger of reading start of the contact type image scanner 14. Further, at a portion near a moving end in the traveling path 10, the second frame 12 is provided with a non-contact communication antenna 22 for communicating with the information recording medium 30 in a non-contact state, i.e., communicating with a contact-less IC.

The second frame 12 is formed with a hook part 18 which permits the support plate 15 to move in a direction parallel to the traveling path 10, and the support plate 15 is formed with a hook engaging part 19 for engaging with the hook part 18. The hook part 18 and the hook engaging part 19 structures a fixing part whose function will be described in detail below.

FIGS. 5(a) and 5(b) are explanatory views for explaining a function of the hook part 18 and the hook engaging part 19 in the information processing device 1B.

FIG. 5(a) shows a state where the support plate 15 is in a closed position (locked position) and FIG. 5(b) shows a state where the support plate 15 is in an open position. For convenience of description, the support plate 15 is shown with hatching in FIG. 5(a).

In the state where the support plate 15 has been closed in FIG. 5(a), the hook engaging part 19 engages with the hook part 18 and the support portion 23 which axially supports the support plate 15 is located on the most starting end side (the most right side in FIG. 5(a)) of the traveling path 10 in a range where the support plate 15 is movable. At this time, the support plate 15 is in a locked state to the second frame 12 at a locked position where the roller 16 is protruded to the traveling path 10. Roller 16 may have a center shaft 16a. When the support plate 15 is in the locked position, the roller 16 can abut with a part of the opening 12a to urge the support plate 15 to the locked position by an urging force of the flat spring 17B.

More specifically, as shown in FIG. 6, when the roller 16 abuts with the part of the opening 12a, a counteractive force as shown by the arrow (D) acts to the roller 16 from the opening 12a by the urging force of the flat spring 17B. Therefore, a force to urge the support plate 15 in a direction shown by the arrow (E) is generated. As a result, as shown in FIG. 5(a), the support portion 23 for axially supporting the support plate 15 is maintained and locked at the most leading end side of the movable range in the traveling path 10 where the medium is traveled (the most right side position in FIG. 5(a)). In this manner, a half-lock state is prevented in the information processing device 1B. In this embodiment, the size of the opening 12a is set so that a spring force can be applied to the roller 16 when the roller 16 is moved downward. Further, in this embodiment, the support plate 15 is locked by utilizing the urging force of the flat spring 17B which urges the information recording medium 30 to the contact type image scanner 14 side.

Next, a method of releasing the lock state shown in FIG. 6 and of opening the support plate 15 will be described below. In FIG. 5(a), firstly, the hook engaging part 19 (resin spring portion) is moved upward in FIG. 5(a) (see the arrow (A)) and then the support plate 15 is slid to the left side in FIG. 5(a) (see the arrow (B)). In other words, the hook engaging part 19 is slid in an opposite direction to the direction where the reading start sensor 20 is disposed. After that, the support plate 15 is turned with the support portion 23 as a turning center (see the arrow (C)), and the roller 16 and the flat spring 17B are separated from the opening 12a. The state where the support plate 15 is opened is shown in FIG. 5(b).

In order to return the support plate 15 to the closed state, reverse steps for the support plate 15 and the hook engaging part 19 are performed. In other words, firstly, the support plate 15 is turned to bring the roller 16 and the flat spring 17B close to the opening 12a and to bring the hook engaging part 19 near the hook part 18. Then, the hook engaging part 19 is further lifted a little to make the support plate 15, i.e., the hook engaging part 19 slide to the right side in FIG. 5(a). As a result, the hook engaging part 19 engages with the hook part 18 and the support plate 15 is held in the locked position. In this locked position, a groove of the hook part 18 and a protruded part of the hook engaging part 19 are fitted to each other and thus a spring force of the flat spring 17B is prevented from being released.

As described above, according to the information processing device 1A or the information processing device 1B, as shown in FIG. 2(b) or FIG. 5(b), the roller 16 as well as the reading face 14a of the contact type image scanner 14 can be visually observed by turning the support plate 15 and thus fragments and dust which are stuck to the reading face 14a and the roller 16 can be removed surely.

Especially, like the information processing device 1A shown in FIG. 2(b), when the LED 21 is provided in the support plate, the LED 21 can be also cleaned while visually observed. Further, the LED 21 and the reading start sensor 20 in the information processing device 1A are a non-contact type element to an information recording medium and thus dirt cannot be removed directly by a cleaning card. However, according to the embodiments described above, dirt can be removed directly by turning the support plate 15 and thus maintenance performance and device reliability can be improved.

Further, as shown in FIG. 2(b) or FIG. 5(b), since cleaning can be performed only by turning the support plate 15, the entire size of the information processing device 1A or the information processing device 1B can be compact. Further, as shown in FIG. 2(b), the roller 16 and the LED 21 are modularized through the support plate 15 or, alternatively, as shown in FIG. 5(b), the roller 16 and the flat spring 17B are modularized through the support plate 15. Therefore, a user can customize freely and thus convenience for user can be improved.

Further, in the information processing device 1B, as described in detail with reference to FIG. 6, in the case that the hook engaging part 19 engages with the hook part 18 to be in a lock state, when the roller 16 abuts with a part of the opening 12a, a force for urging the support plate 15 is generated in a direction shown by the arrow (E) (see FIG. 6) by the urging force of the flat spring 17B and thus half-lock state of the support plate 15 can be prevented. Since the urging force of the flat spring 17B can be utilized in various manners, in other words, since one piece of part serves various functions, number of components can be reduced. Further, only when the hook engaging part 19 is engaged with the hook part 18, a lock state is obtained and thus a half-lock state can be prevented easily and surely.

Further, in the information processing device 1B, as shown in FIG. 5(a), the support portion 23 of the support plate 15 is only movable in a direction parallel to the traveling path 10 and unable to move in a direction perpendicular to the traveling path 10. Therefore, a force with which the roller 16 urges the information recording medium 30 can be set uniformly and thus reading accuracy of the contact type image scanner 14 can be improved.

Further, as shown in FIG. 5(a), the support portion 23 in the information processing device 1B is disposed on the leading side of the traveling path 10 (right side in FIG. 5(a)) of the contact type image scanner 14, i.e., on the starting side of traveling of the information recording medium 30. Therefore, the non-contact communication antenna 22 can be provided on the terminating side of the traveling path 10 (see FIG. 4). At a terminating end position of the traveling path 10, a swipe operation by an operator is stopped after the contact type image scanner 14 has communicated with the information recording medium 30 through the swipe operation. Therefore, the information recording medium 30 can be stopped at a position capable of communicating with the non-contact communication antenna 22 with a high degree of accuracy. As a result, a practical hybrid type information processing device 1B can be obtained. Specifically, as shown in FIG. 4, the non-contact communication antenna 22 is arranged on the second frame 12 which is disposed on the opposite side to the first frame 11 on which a control board 13 and the contact type image scanner 14 are mounted. Therefore, since the control board 13 and the contact type image scanner 14 are not disposed near the non-contact communication antenna 22, communication quality can be improved.

Further, as shown in FIG. 4, in the information processing device 1B, the reading start sensor 20 and the contact type image scanner 14 are disposed close to each other in a state where the reading start sensor 20 is positioned on the leading side (right side in FIG. 4) of traveling path 10 where traveling of the information recording medium 30 is started. Therefore, an interval after a sensor signal has been outputted till communication with the information recording medium 30 is started can be shortened and thus reading accuracy of information can be improved Further, even when the support plate 15 is slid (see the arrow (B) in FIG. 5(a)), the roller 16 can be prevented from interfering with the reading start sensor 20.

Modified Embodiments

In the information processing device 1A in accordance with the first embodiment, the wire spring 17A is used as an example of the first urging member. However, the first urging member may utilize any member which is capable of urging the support plate 15 in a direction toward the open position, for example, a flat spring or a coil spring. Further, in the information processing device 1B in accordance with the second embodiment, the flat spring 17B is used as an example of the second urging member. However, the second urging member may utilize any member, for example, a wire spring or a coil spring, which is capable of urging the roller 16.

In the first embodiment and the second embodiment, the roller 16 is used as an example of the pressing member but, for example, a magnetic head may be used. According to the structure as described above, obtaining of an optical image information and reading and/or writing of a magnetic information can be performed simultaneously and thus information can be efficiently obtained.

Further, in the information processing device 1B in accordance with the second embodiment described above, the non-contact communication antenna 22 is disposed at a position shown in FIG. 7(a) but may be disposed, for example, as shown in FIG. 7(b), to be perpendicular to the support plate 15 (information processing device 1C). When a plurality of attaching parts 24a and 24b for non-contact communication antenna is formed in the information processing device, position and posture of the non-contact communication antenna 22 can be changed and thus various standards of passports can be adopted. For example, in a case that the non-contact communication antenna 22 is arranged at a position as shown in FIG. 7(a), contact-less communication can be performed with the non-contact communication antenna 22 under a state where a passport is inserted into the traveling path. Alternatively, in a case that the non-contact communication antenna 22 is arranged at a position as shown in FIG. 7(b), contact-less communication can be performed with the non-contact communication antenna 22 under a state where a passport is placed on the traveling path. In accordance with the embodiments shown in FIGS. 7(a) and 7(b), the non-contact communication antenna 22 is mounted so as to be detachable by a customer through resin claw parts as an example of the attaching parts 24a and 24b for non-contact communication antenna. In FIGS. 7(a) and 7(b), one piece of the non-contact communication antenna 22 is provided but two or more antennas 22 may be provided. For example, when the non-contact communication antennas 22 are arranged at both of the positions shown in FIGS. 7(a) and 7(b), most standards of passports can be adopted. Further, the non-contact communication antenna 22 described in detail with reference to FIGS. 7(a) and 7(b) can be applied to the information processing device 1A in accordance with the first embodiment.

In the first embodiment and the second embodiment, the present invention is applied to the swipe type information processing device 1A or the swipe type information processing device 1B. However, the present invention may be applied to another type of information processing device, for example, a plug-in type (DIP type) information processing device.

The present invention is effective to an information processing device in which fragments and dust stuck to a reading face of a scanner and a roller is required to be removed surely. Further, the present invention is also effective to an information processing device in which a half-lock state is prevented.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An information processing device for use with an information recording medium comprising:
    a traveling path on which the information recording medium is carried;
    a first frame which is provided with a scanner for reading information recorded on the information recording medium;
    a second frame which faces the first frame across the traveling path and is provided with a pressing member for pressing the information recording medium toward a reading face of the scanner;
    a support plate comprising a first end and a second end opposite to the first end, wherein the support plate supports the pressing member and is axially supported with the second frame at the first end to be movable between a locked position where the pressing member is protruded in the traveling path and an open position where a reading face of the scanner is exposed;
    a locking part for locking the support plate to the second frame at the locked position; and
    a half lock preventing mechanism for preventing a half-lock state when the support plate is locked to the second frame.

2. The information processing device according to claim 1, wherein
    the locking part comprises a pawl member which is urged in a direction roughly parallel to the traveling path and a pawl engaging member having a recessed part with which the pawl member engages;
    the pawl member is provided in one of the second end of the support plate or the second frame;
    the pawl engaging member is provided in the other of the second end of the support plate or the second frame; and
    when the support plate is located at the locked position, the half lock preventing mechanism prevents movement of the support plate toward the open position due to engagement of the pawl member with the pawl engaging member.

3. The information processing device according to claim 2, wherein
    the half lock preventing mechanism further comprises a first urging member which is disposed near the first end of the support plate for urging the support plate toward the open position; and
    the first urging member causes the support plate to move toward the open position when engagement of the pawl member with a recessed part of the pawl engaging member is released; and
    the first urging member urges the support plate to maintain a distance between the pressing member disposed on the support plate and the traveling path when the support plate is located at the locked position.

4. The information processing device according to claim 1, further comprising:
    a sensor for detecting the information recording medium, the sensor comprising a light emitting element for emitting light to the information recording medium and a light receiving element for receiving the light from the light emitting element;
    wherein one of the light emitting element or the light receiving element is mounted on the support plate and the other of the light emitting element or the light receiving element is mounted on the first frame.

5. The information processing device according to claim 1, further comprising:
    a second urging member for urging the pressing member in a direction for pressing the information recording medium; and
    an opening which is formed in the second frame for permitting the pressing member to protrude in the traveling path;
    wherein the support plate is supported so that the pressing member and the second urging member are capable of being close to or separated from the opening; and the half lock preventing mechanism is structured in which, when the support plate is going to be locked to the locked position, the pressing member abuts with a part of the opening to urge the support plate toward the locked position by an urging force of the second urging member.

6. The information processing device according to claim 5, wherein
a support portion of the support plate which axially supports the support plate is movable in a direction that is roughly parallel to the traveling path; and
the locking part comprises
a hook part which is provided in one of the second frame or the support plate for permitting movement of the support plate in the direction roughly parallel to the traveling path; and
a hook engaging part which is provided in the other of the second frame or the support plate for engaging with the hook part.

7. The information processing device according to claim 6, wherein the support portion is provided on a leading side to the scanner of the traveling path where carrying of the medium is started.

8. The information processing device according to claim 1, further comprising a sensor for detecting the information recording medium;
wherein the sensor and the scanner are closely disposed along a carrying direction of the information recording medium in this order.

9. The information processing device according to claim 1, wherein the pressing member is one of a roller and a magnetic head.

10. The information processing device according to claim 1, further comprising a non-contact communication antenna which is provided on the second frame and disposed near an end of the traveling path for non-contact communicating with the information recording medium.

11. The information processing device according to claim 1, further comprising a plurality of non-contact communication antenna attaching parts which is provided on the second frame and disposed near an end of the traveling path for attaching and detaching a non-contact communication antenna for non-contact communicating with the information recording medium.

* * * * *